F. BEERS AND H. L. POWELL.
APPARATUS FOR COATING CAKES, ETC.
APPLICATION FILED AUG. 27, 1920.
1,424,232.
Patented Aug. 1, 1922.
3 SHEETS—SHEET 1.
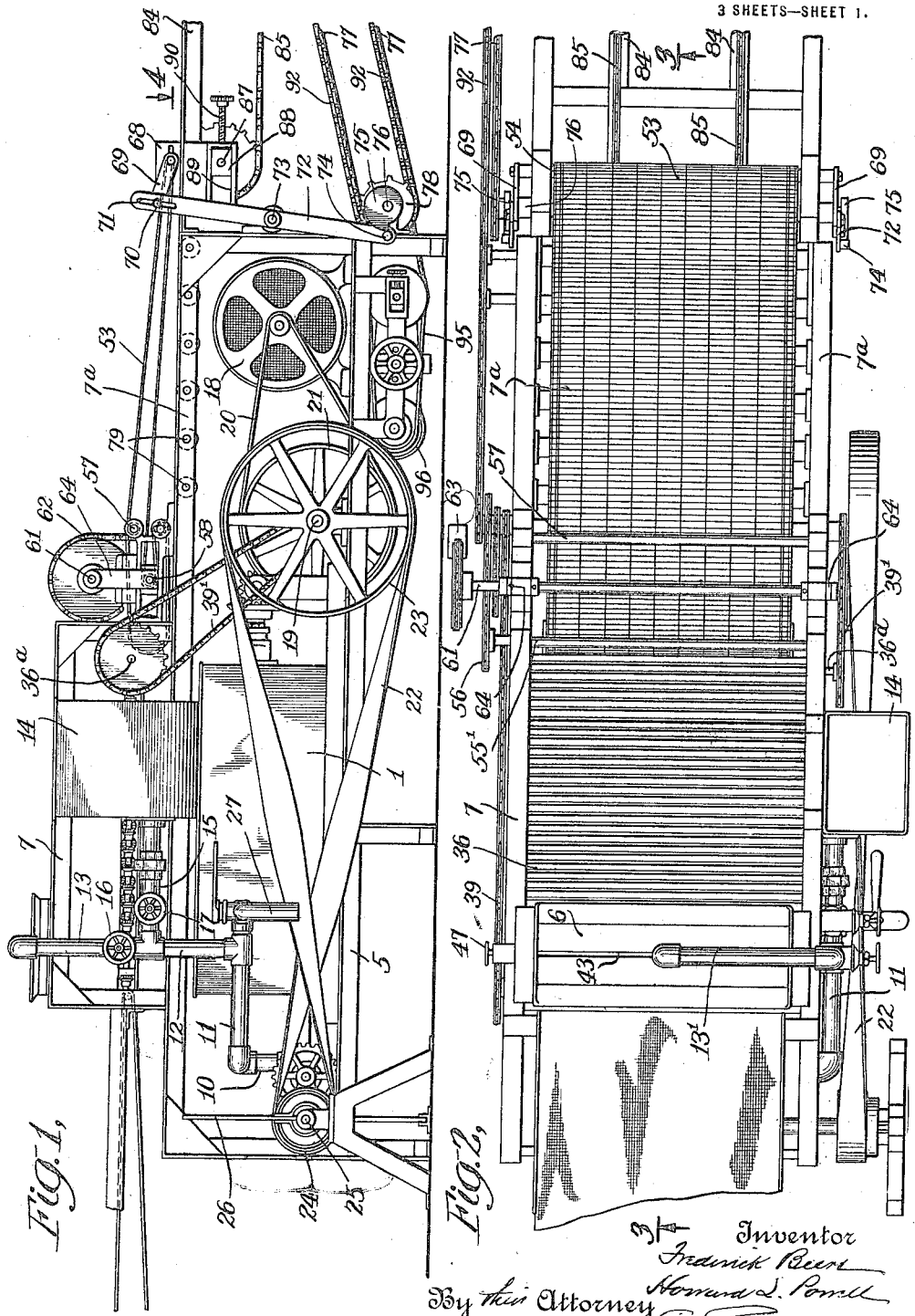

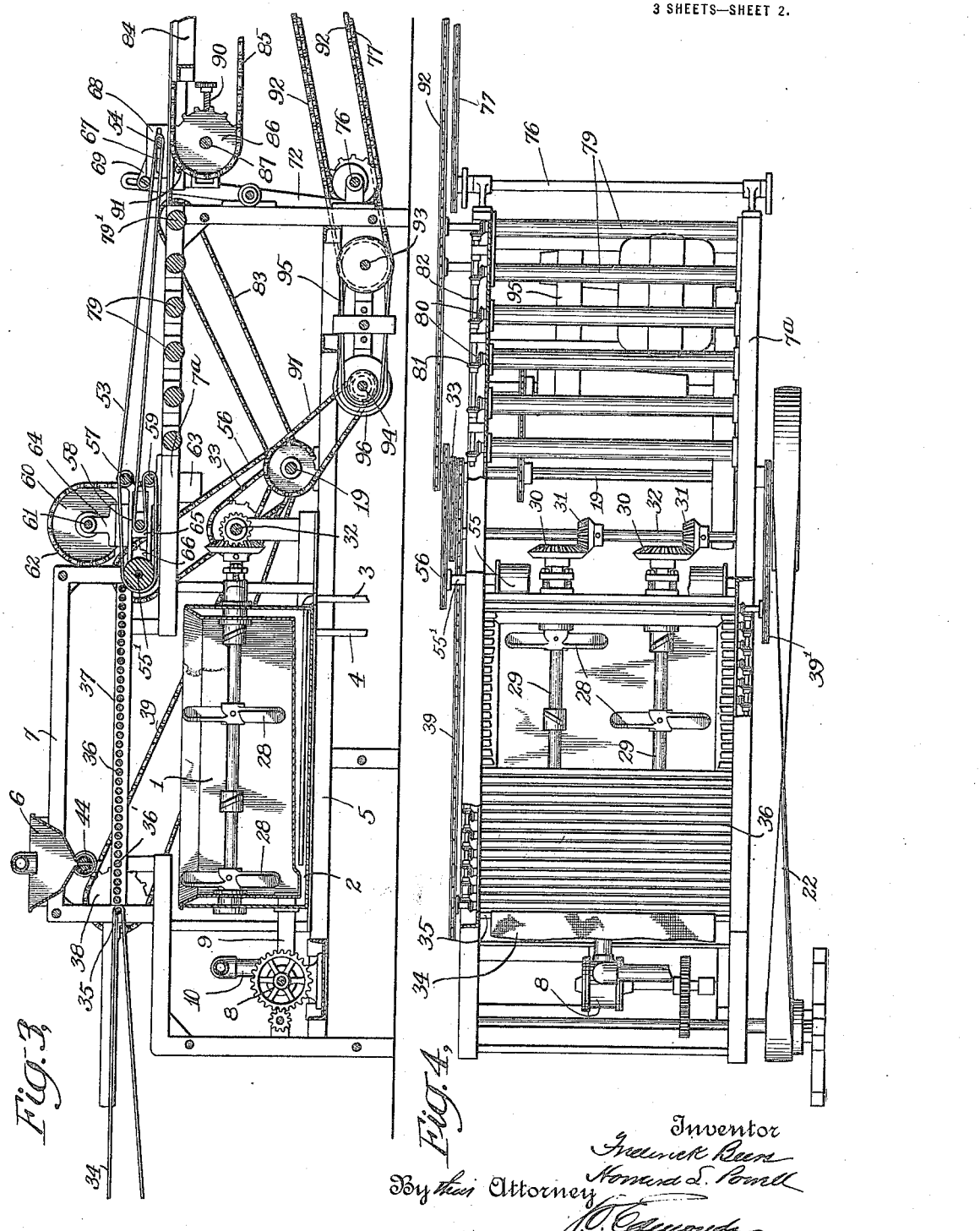

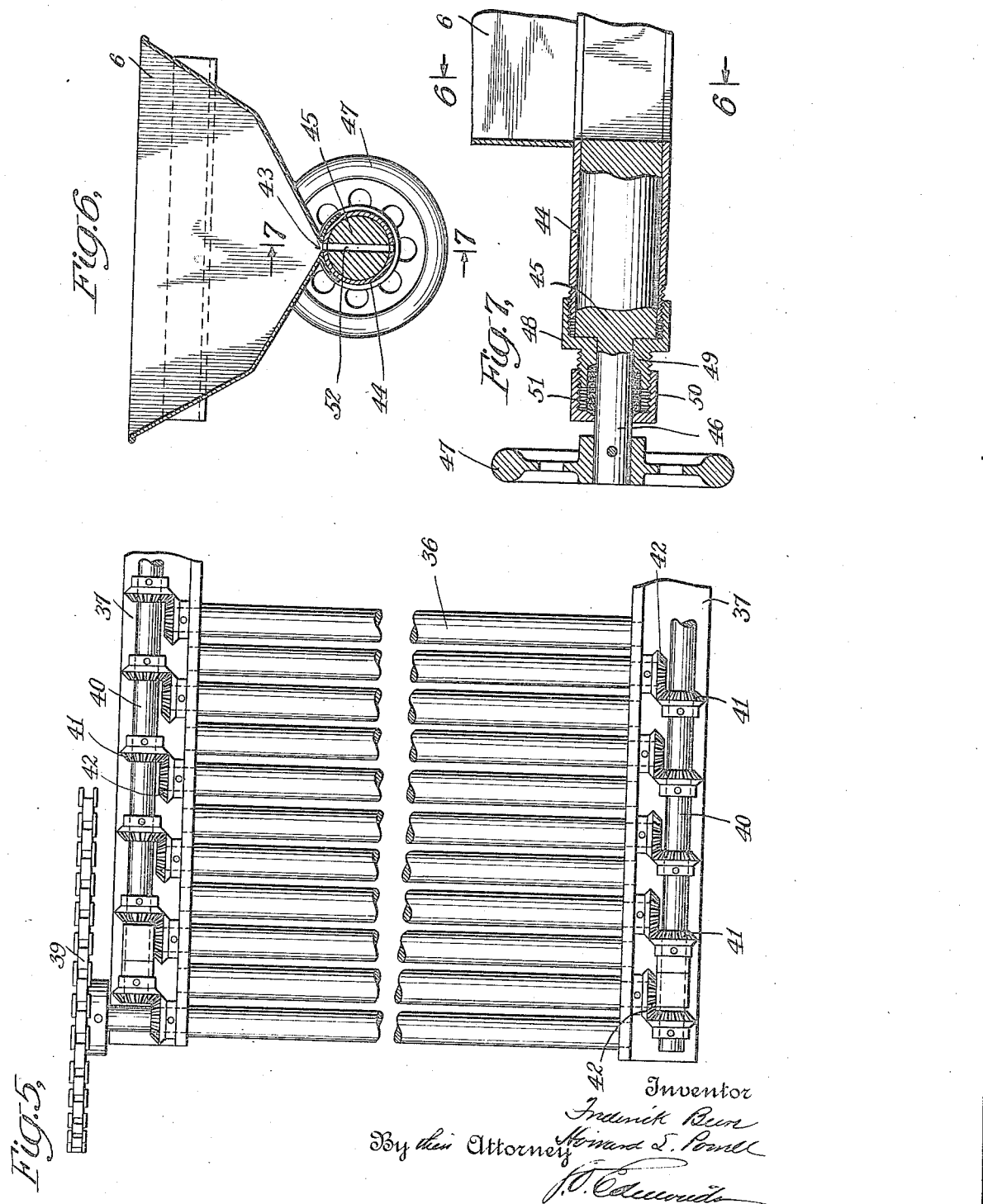

UNITED STATES PATENT OFFICE.

FREDERICK BEERS, OF NEW ROCHELLE, AND HOWARD L. POWELL, OF NEW YORK, N. Y., ASSIGNORS TO NATIONAL BISCUIT COMPANY, OF NEW YORK, N. Y., A CORPORATION OF NEW JERSEY.

APPARATUS FOR COATING CAKES, ETC.

1,424,232.   Specification of Letters Patent.   Patented Aug. 1, 1922.

Application filed August 27, 1920. Serial No. 406,448.

*To all whom it may concern:*

Be it known that we, FREDERICK BEERS, a resident of New Rochelle, in the county of Westchester and State of New York, and HOWARD L. POWELL, a resident of the borough of Manhattan, city, county, and State of New York, both citizens of the United States, have invented certain new and useful Improvements in Apparatus for Coating Cakes, Etc., of which the following is a specification.

Our invention relates to apparatus for coating cakes and the like with icing or chocolate or similar substances. Our invention is designed to improve the construction of such machines, which are sometimes termed enrobing machines, in various particulars so as to make the same more efficient and effective, more cleanly and simple in operation.

In accordance with our invention the cakes to be coated on both sides are fed on to a carrier device which extends above a vat in which the melted chocolate, or other coating material, is carried. The carrier device referred to is an improved feature of our invention and consists of a series of rolls which are mounted close together and rotated in unison so that the cakes will be moved from one to the other by the rotation of the rolls. Chocolate or other coating material is fed through a valve mechanism above the cakes, the coating material dropping in a thin sheet upon one of the rolls referred to so that the cakes, as they advance on to that roll will receive a coating on their under sides from contact with the material carried by the roll and a coating on their upper sides, from the material dropped directly on the cakes. We have found that the carrying means for the cakes during the coating of the same, as described, is an improvement in various respects over the various forms of endless belts and the like which are commonly used for the purpose. The valve mechanism which we prefer to use, through which the coating material drops on to the cakes and rolls, is preferably adjustable so as to increase or decrease at will the rate at which the material drops.

When the coated cakes reach the end of the series of rotating rolls referred to they move on to an endless belt or the like which carries them to a point at which they drop on to one or another of a series of trays which are progressed to that point, preferably by passing over a series of rotating rolls similar to those just described. The trays are then carried away by an endless carrier or the like to be dried, or for other desired purposes.

The trays are progressed in close alignment, one after the other to the point at which the coated cakes are dropped into the same. At this point, however, as the trays are carried away by a different mechanism, there is apt to be a space between the tray which is being filled and the next succeeding tray, which is advancing to the point at which it is to be filled. Our invention includes improved means for automatically moving the point at which the cakes drop into a tray, forward or back, at the proper times, to prevent any of the cakes being dropped between trays.

Other features of our invention will be brought out in the following specification and appended claims.

In order that our invention may be more clearly understood attention is hereby directed to the accompanying drawings forming part of this application and illustrating one embodiment of our invention. In the drawings Fig. 1 represents a side elevation of an apparatus embodying our invention, Fig. 2 is a top plan view of the same, Fig. 3 is a vertical section taken on line 3—3 of Fig. 2, Fig. 4 is a horizontal section taken on line 4—4 of Fig. 1, Fig. 5 is an enlarged partial top plan view of the rotating rolls over which the cakes are carried during the coating of the same, Fig. 6 is an enlarged vertical section taken through the hopper and valve for the coating material, this view being a section on line 6—6 of Fig. 7 and Fig. 7 is a vertical section taken on line 7—7 of Fig. 6.

Referring to the drawings, tank 1 is employed for holding melted chocolate or other coating material in liquid form. This tank may be provided with a jacket 2 through which steam may be circulated for heating the tank or through which a cooling medium may be circulated, if desired, by means of pipe connections 3 and 4.

A frame 5 of suitable character is provided for supporting the various parts of the apparatus. A hopper 6 is mounted on an upper frame member 7 above tank 1 to which the coating material is supplied. In the embodiment of our invention illustrated a pump indicated at 8 is employed to draw the coating material through pipe 9 from tank 1 and force the same upwardly through pipe connections 10, 11, 12 and 13 into the hopper 6 from which it again drops into the tank. Tank 1 is adapted to be filled from a hopper 14 at one side thereof. A by-pass pipe 15 extends from a T connection with pipes 12 and 13 to hopper 14, pipes 13 and 15 being provided with valves 16 and 17 so that the coating material may be supplied to hopper 6 at a greater or less rate, as desired, the excess material being returned through the pipe 15 and hopper 14 to tank 1.

Power may be supplied from an appropriate source such as the electric motor 18 mounted on frame 5. The transverse shaft 19 is continuously rotated from the motor by belt connection 20 extending over a sheave 21 on shaft 19. The pumping apparatus 8 is rotated by a belt 22 extending around sheaves 23 and 24 on shafts 19 and 25 respectively which latter is connected through a clutch, governed by clutch lever 26 and appropriate gears to the pumping apparatus. The circulating system for fluid coating material may be provided with a draw-off connection 27.

Stirrers are preferably provided in tank 1 for agitating the coating material. These may take the form of stirrers or paddles 28 mounted on shafts 29 which are connected by bevel gears 30, 31 to a shaft 32 which may be rotated from shaft 19 by a sprocket chain 33 passing over appropriate sprocket wheels on shafts 32 and 19.

Cakes, or other articles to be coated, are positioned on an endless carrier indicated at 34 rotating about a shaft 35 mounted horizontally in the upper frame work of the apparatus.

The cakes pass off of the forward end of conveyer 34 on to the first of a series of parallel rollers 36 which extend horizontally above tank 1 and below hopper 6 for a distance which may be somewhat greater than the length of tank 1. These rollers are rotatably mounted in side frame members 37 of the upper frame work 7 members 37 preferably being angle bars. The first one of the rolls 36 is provided at its end with a sprocket wheel 38 which is rotated by a sprocket chain 39 which runs over a sprocket wheel on shaft 19. The last one of the rolls may also be driven at the opposite side of the apparatus by sprocket chain 39' extending to shaft 19.

The rollers 36 are all rotated at the same speed and in the same direction, preferably with bevel gear connections with each other. In the preferred arrangement horizontal shafts 40 are mounted above the frame members 37 and provided with bevel gears 41 which mesh with bevels 42 on the ends of rollers 36. Preferably the driving connections for the rollers are positioned at the opposite ends of the same alternately, as shown, because of the fact that the rolls are placed closely together so that room would be lacking for providing all of the same with bevels at the same ends of the rolls.

With this arrangement, the rolls 36, all rotating in a right handed direction, referring to Fig. 3 for example, the cakes which pass on to the rolls from the conveyer 34 will be progressed over the rolls because of the rotation of the latter.

Coating material which passes upwardly through pipe 13 passes through the horizontal extension 13' of the same into the hopper 6 as stated. The hopper 6 is provided with an opening 43 extending in a horizontal slit which extends lengthwise of rolls 36. The hopper carries a pipe or sleeve 44, beneath the same, which likewise has a horizontal slot aligning with the slot 43 in the bottom of the hopper. A cylindrical member 45 is rotatably mounted within sleeve 44, member 45 having an extension 46 of reduced diameter provided at one end with a hand wheel 47. Sleeve 44 may be threaded at its ends and have a cap 48 threaded thereon, this cap having an extension 49 of reduced diameter which constitutes a bearing for the reduced portion 46 of member 45. The portion 49 of member 48 may be threaded and have a cap 50 threaded thereon with packing material 51 held in place in a suitable recess between members 49 and 50.

The cylindrical member 45 is provided with a longitudinal slot 52 extending therethrough and adapted to align with the longitudinal slot 43 in the bottom of hopper 6. By turning hand wheel 47 the opening through the bottom of the hopper may be opened or closed or the amount of opening varied to suit desired conditions so that the coating material will drop from the hopper in greater or less volume.

The stream or sheet of coating material passing through the valve at the bottom of hopper 6 should fall directly upon one of the rolls 36, this roll being indicated at 36' in Fig. 3. This roll, accordingly, will at all times be coated to a considerable extent with chocolate or other material. The cakes passing over rollers 36 will be coated on their under surfaces by the coating material carried on roll 36' and will be coated on their upper surfaces by the coating material which falls directly on them from hopper 6. Surplus coating material drops into tank 1.

The rolls 36 constitute an improvement over the usual flexible carriers which are employed for conveying the cakes while the same are being coated for the reason that the same are more sanitary, more durable, and also because of the difficulty of causing a belt, which is heavily coated with chocolate or the like, to properly bend when the same passes about pulleys.

The coated cakes pass from the last roll 36 of the series on to an endless conveyer 53. This conveyer at its far end passes over a transverse member 54. At its forward end the conveyer passes around a roller 55 on shaft 55' by which the conveyer is rotated, roller 55 being rotated by a sprocket chain 56 which passes around sprocket wheels on the shaft of roller 55 and on the main driving shaft 19.

The conveyer 53 passes, after leaving roller 55, over an idler 57 whence it passes around member 54 and then, returning, passes around an idler 58. From this point the conveyer loops forwardly to pass around an idler 59 beneath idler 57 and then passes around roller 55 to the point first mentioned.

A sprocket wheel 60 is mounted above the forward portion of conveyer 53, described, wheel 60 being mounted on a shaft 61. A chain 62 extends about wheel 60 and is secured to the wheel at one end, the chain carrying the weight 63 suspended from its other end.

Shaft 61 has a pair of arms 64 secured to the same at opposite sides of the longitudinal frame members 7ª, 7ª, above which shaft 61 is mounted. Arms 64 are bifurcated at the bottom and straddle a shaft 58 as is indicated in Fig. 1. Shaft 58 is rotatably mounted in blocks 65 which are slidably mounted in longitudinal slideways 66. Shafts 55', 57 and 59 are rotatably mounted in fixed bearings. Accordingly, the counterweight 63 constantly tends to swing arms 64 in a clockwise direction, referring to Figs. 1 and 3, and accordingly move shaft 58 to the left so as to take up any slack in the conveyer 53.

The forward end of conveyer 53 passes around a member 54, as stated, this member preferably having flat top and bottom and a rounded forward edge. Member 54 is slidably mounted in a horizontal slideway 67 in a block 68. Arms 69, 69 are pivotally connected at their forward ends to member 54. At their rear ends these arms are connected by pin and slot connections 70, 71 to a pair of levers 72 which extend in vertical planes and are pivotally mounted intermediate their ends at 73.

Levers 72 are provided adjacent their lower ends with pins 74 which are adapted to ride on the peripheries of cams 75 on shaft 76. Shaft 76 is rotated by a sprocket chain 77 which extends around a sprocket wheel 78 on shaft 76. Sprocket chain 77 may be considered as rotating from a source of power, not shown, at the opposite end of chain 77.

The result of the construction thus described is that the forward end of conveyer 53, passing around member 54, is advanced slightly during the rotation of cams 75 until the rollers 74 drop off of the high points of the cams when member 54 is immediately drawn rearwardly a distance proportional to the drop from the high points to low points of cam 75, the conveyer 53 being drawn in a left handed direction at this time by action of counterweight 63 and roller 58 as described above.

Empty trays, in which the coated cakes are to be deposited are positioned one after the other on rollers 79 which are mounted for rotation in the side frames 7ª. These rollers are rotated all in the same direction in the same manner as rollers 36 previously described. Rollers 79 may be provided with bevels 80 on one end of each of the same which mesh with bevels 81 on a longitudinal shaft 82 mounted above one of the side frames 7ª. The forward roller 79', of the rollers 79, is connected by a sprocket chain 83 with shaft 19, sprocket chain 83 running over suitable sprocket wheels on the shaft of roller 79' and shaft 19.

The empty trays which are positioned on rollers 79 are progressed one after the other beneath member 54 at the forward end of conveyer 53 at which point they pass on to horizontal tracks 84. Sprocket chains 85 pass around sprocket wheels 86 mounted on a shaft 87 below the forward end of conveyer 53, the upper levels of sprocket chains 85 running over tracks 84. Sprocket chains 85 may be considered as driven from a suitable source of power, not shown, at their opposite ends. Shaft 87 is preferably mounted in blocks 88 which may be adjustably positioned in slideways 89, at a point determined by adjusting screws 90, so as to take up slack in chains 85. Chains 85 are provided with lugs 91 at intervals which lugs are adapted to engage the rear edges of trays mounted on the same to carry the trays along.

With the construction described coated cakes drop off the forward end of conveyer 53 into one of the trays which has been progressed from rotating rollers 79 on to chains 85 until the tray has been filled when the conveyer 53 is snapped rearwardly a sufficient distance to bridge the gap between the rear end of that tray and the forward end of the following tray so that none of the cakes will be dropped between the trays, the timing of the apparatus being properly arranged to effect this result.

The sprocket chain 92 rotates around a sprocket wheel on a shaft 93. Shaft 93 is adapted to be driven at a variable speed from shaft 94, shafts 93 and 94 being connected by a belt 95 which is adapted to run around one or another pair of cone pulleys 96 so as to produce a variable speed of shaft 93 in the well known manner, shaft 94 being rotated from shaft 19 by a sprocket chain 97 rotating about suitable sprocket wheels on shafts 94 and 19.

It should be understood that our invention is not limited to the exact details of construction described but is as broad as is indicated by the accompanying claims.

What we claim is:—

1. In cake coating apparatus, the combination of a conveyor on which coated articles are placed, and having a delivery point, means for continuously progressing trays to be filled beneath said conveyor to a position beneath said point and beyond the same, and means for automatically periodically moving said delivery point slowly a short distance forwards, and then quickly to the rear, as the rear end of a tray passes beneath the same, to position the same above the forward end of a following tray.

2. In cake coating apparatus, the combination of an endless conveyor on which the cakes are placed, driving means about which the same passes at its rear end, means mounted for horizontal movement about which said conveyor passes at its forward end, means for periodically moving said last named means quickly to the rear, and thereafter advancing it slowly to its former position, means for progressing trays to be filled beneath the forward end of said conveyor, and yieldable means constantly tending to draw the lower level of said conveyor to the rear, so as to draw the same when said means mounted for horizontal movement is moved rearwardly, to take up slack in said conveyor.

3. In cake coating apparatus, the combination of an endless conveyor on which the cakes are placed, driving means about which the same passes at its rear end, means mounted for horizontal movement about which said conveyor passes at its forward end, means for periodically moving said last named means quickly to the rear, and thereafter advancing it slowly to its former position, said means comprising a continuously rotating cam, a roller bearing on said cam, and pivoted connections between said roller and horizontally movable means, rollers about which the lower level of said conveyor passes to form a loop, means for progressing trays to be filled beneath the forward end of said conveyor, and means for moving one of said rollers when said means mounted for horizontal movement is moved rearwardly, to take up slack in said conveyor, the position of said roller being governed by that of said means mounted for horizontal movement.

4. In cake coating apparatus, the combination of an endless article conveyor, driving means for the same, a member about which the same passes at its forward end, means for periodically moving said member quickly to the rear, and thereafter returning it to its former position, means for progressing trays to be filled beneath the forward end of said conveyor, a stationary roller and a movable roller about which the lower level of said conveyor passes to form a loop, pivoted arms constantly pressing said movable roller in suitable direction to maintain the tautness of said conveyor, and yielding means continuously pressing said arms in said direction.

This specification signed and witnessed this 20th day of August, 1920.

FREDERICK BEERS.
HOWARD L. POWELL.

Witnesses:
G. M. SUNDHEIM,
L. D. KIDD.